United States Patent [19]
Erk et al.

[11] Patent Number: 4,786,512
[45] Date of Patent: Nov. 22, 1988

[54] CASING FOR RAW SAUSAGE, A PROCESS FOR THE PRODUCTION OF SAID CASING, AND ITS USE FOR SAUSAGE PRODUCTS THAT ARE AIR-CURED

[75] Inventors: Gayur Erk; Joachim Kühn, both of Weinheim/Bergstrasse, Fed. Rep. of Germany

[73] Assignee: Naturin-Werk Becker & Co., Weinheim/Bergstrasse, Fed. Rep. of Germany

[21] Appl. No.: 888,858

[22] Filed: Jul. 23, 1986

[30] Foreign Application Priority Data

Jul. 24, 1985 [DE] Fed. Rep. of Germany ....... 3526394

[51] Int. Cl.$^4$ ................................................ A23L 1/00
[52] U.S. Cl. .................................... 426/105; 138/118.1
[58] Field of Search ...................... 138/118.1; 426/105; 428/36, 116, 167, 170, 171

[56] References Cited

U.S. PATENT DOCUMENTS

3,779,285 12/1973 Sinibaldo .......................... 138/118.1
3,867,249 2/1975 Vitale et al. ......................... 428/167

FOREIGN PATENT DOCUMENTS

959878   4/1954  Fed. Rep. of Germany .
2322220 10/1974  Fed. Rep. of Germany .
2827384  1/1980  Fed. Rep. of Germany .
3229524  2/1984  Fed. Rep. of Germany .

*Primary Examiner*—Mark J. Thronson
*Attorney, Agent, or Firm*—Becker & Becker, Inc.

[57] ABSTRACT

A sausage casing of an isotropic spun fleece of at least one polyamide, containing no binding agent, is joined in the longitudinal direction so as to form a tube and is partially compressed. Further, the invention relates to a process for the production of the sausage casing and its use for containing sausage products that are air-cured. Special mechanical and elastic characteristics are achieved by partial compression whereas the gas and water permeability for the raw sausage is retained to the required extent. The casing shrinks with the filling on curing, remains wrinkle-free, does not allow grease to escape, and can be easily peeled.

14 Claims, 4 Drawing Sheets

Hooke-Region | $l_D$

CASING FOR RAW SAUSAGE, A PROCESS FOR THE PRODUCTION OF SAID CASING, AND ITS USE FOR SAUSAGE PRODUCTS THAT ARE AIR-CURED

BACKGROUND OF THE INVENTION

1. Field of the Invention

The present invention relates to a sausage casing, consisting of an isotropic spun fleece which is free of binding agent, is welded, cemented or stitched in the longitudinal direction, and consists of at least one polyamide and is partially compressed. Further, the present invention relates to a process for the production of such a sausage casing and for its use as directed for packing with sausage products that are to be air-cured.

2. Description of the Prior Art

Raw sausages are known to the consumer, for example, as salami, saveloy, or servalat sausages. These are produced from mixtures comprising coarse to medium-fine ground beef, pork, bacon, pickled beef, and spices, without the addition of water. Once the sausage casings have been filled with the mixture which has been cooled to approximately $-4°$ C. and is for this reason very solid, the sausages are sweated for 1-2 days at approximately $18°-25°$ C. and at 98% relative humidity whereupon the characteristic red colour of the meat develops. Subsequently, the sausages are lightly smoked for approximately 3 days at $18°-20°$ C. and are then cured at a maximum temperature of $18°$ C. for several weeks in a curing chamber with slight air circulation, whereupon they lose between 25-45% of their weight in the form of water.

During the filling process, great demands are placed on the strength and elasticity of the casings, especially if automated filling processes are used, since what is required is an even solid filling in a cylindrical shape that is free of bulges.

In order that the curing process can proceed unhindered, the sausage casings must permit the passage of water vapor so that when water from the sausage interior reaches the surface of the meat filling, it can diffuse immediately through the casing and then evaporate from the surface of the sausage. Of course, a corresponding contraction in volume is associated with this loss of water and this becomes apparent primarily in a reduction in the circumference of the sausage, which the casing should follow by shrinking to the same extent.

During the course of the curing process, the fat that is contained in the raw sausage becomes more and more mobile and, if the casing is porous, this will then emerge from the sausage and soon become rancid. Since this is unhygienic and bothersome when the sausage is being handled, the sausage casings should also be fat-tight as far as possible.

Apart from sausage casings produced from collagens, which because the material is related to gut, are particularly suitable, it has to date been a problem to combine the characteristics set out above in an optimal manner to provide sausage casings produced from synthetic materials and intended for the production of raw sausage.

Of the many attempts that have been made to replace natural gut for raw sausage by casings of synthetic materials, only very few have achieved a noteworthy share of the market. In addition to collagen sausage casings and those that are impregnated with collagens and/or gelatine, these include woven or similar textile fibre structures, notably fibre reinforced recycled cellulose sausage casings and, to a slightly lesser extent, stitched sausage casings of cotton material.

There has been no lack of attempts to use fleece-type materials as a basis for raw sausage casings, although up to now these have achieved no economic importance due to the serious shortcomings of such materials.

The first attempts to produce sausage casings of fleece-type materials were aimed at the use of such materials as casings for boiling sausages. According to these, DE-PS-No. 19 17 265, DE-OS No. 19 62 331, DE-OS No. 21 05 715, and DE-OS No. 21 54 972 propose fleece-type materials of synthetic staple fibres with the addition of collagen fibres and with a coating of PVDC that is impervious to water vapour.

The use of a spun fleece as a sausage casing was taught for the first time in DE-OS No. 21 28 613. Polyamides, polyolefins, and polyesters were proposed as the starting material. Mixtures of these fibres with skin fibres or cellulose products were also proposed. A disadvantage of this fleece material was the fact that when peeled off, the sausage skins "split"- i.e., when pulled off the sausage, they divided so that the inner layer, which had become joined to the sausage material, had to be picked off and removed in small pieces. In order to alleviate this situation, it was at first proposed to use a lacquering or impregnating process with film-forming polymers. Subsequently, DE-OS No. 24 37 781 proposed preventing this "splitting" by use of a thermomechanical treatment. In this treatment, the spun fleece was calendered when hot so that the individual fibres were retained but became welded or blended together at the crossover points.

DE-OS No. 23 30 774 describes a sausage casing of a staple fibre fleece of polyamide fibres and/or viscose fibres and/or acrylic fibres. This material is stated to be suitable for boiling sausage and for raw sausage.

DE-OS No. 30 29 028 also teaches a sausage casing for the production of raw sausage. It is preferred that this should consist of a thermally consolidated spun fleece of PA or PP fibres, with a wet strength of at least 30N and a wet stretch factor of at least 95% and preferably be impregnated with a 1:1 mixture of polyvinyl alcohol and gelatine, to form a continuous film after drying.

Of the above-cited sausage casings, however, none has ever been commercially available. It is thus obvious that these fleece-type casings for raw sausages still suffer from one or several of the following shortcomings:

1. Insufficient strength, which becomes apparent not so much in bursting during the filling process as in a lack of consistency in diameter. This is to say that on being filled, the casings expand permanently under the filling pressure and for this reason are of varying diameter along their length or even bulge in places.

2. Inadequate permeability with regard to water vapour, which results in the need for an extended drying period-this being the result of using fleece bonding agents or a thermo-mechanical consolidation process that is too intensive to prevent fraying or shredding.

3. Too little capacity for shrinkage, which results in shriveled sausages and also in the casing peeling in places.

4. Inadequate proof against grease, which allows the fat to escape and drip off during the course of the curing process.

5. Fraying, i.e., splitting of the fibres during skinning, caused by inadequate bonding within the fleece itself.

SUMMARY OF THE INVENTION

Thus, it is an object of the present invention to provide a casing for raw sausage having superior strength, permeability to water vapour, shrinkability, proof against grease, and peelability.

BRIEF DESCRIPTION OF THE DRAWINGS

The present invention will now be described further by way of example only and with reference to the accompanying drawings, wherein.

DESCRIPTION OF THE PREFERRED EMBODIMENT

According to the present invention, there is provided a casing of an isotropic spun fleece that is free of bonding agents and is produced from at least one polyamide, said fleece being longitudinally formed into a tube and being partially compressed such that the fleece displays a specific area compression ratio $V_F$ in the range from 0.12 to 2.3 and a depth compression ratio $V_T$ of 0.24 to 0.5.

It is preferred that the polyamide for the spun fleece consist of one or more polyamides selected from the group consisting of PA 6, PA 6-6, PA 6-10, PA 11, PA 12, and/or copolyamides of two or more of the corresponding monomers.

In this connection, it is particularly advantageous that the raw sausage casing according to the present invention has an embossed inner surface which contacts the sausage filling, whilst the outer surface is smooth. Because of the special partial compression that is a feature of the present invention, the raw sausage casing according to the present invention displays the following characteristics:

1. The force-length change diagram for the casing is elastic in accordance with Hooke's Law up to at least 90% of its tensile strength.
2. The transverse irreversible stretching of the casing is always less than 90%.
3. The gradient values $F_y/\Delta l_x$ calculated from the force-length change diagram for the casings amount to at least 1N/mm.

Measurement of these characteristics takes place in accordance with DIN 53 455.

According to a preferred embodiment of the invention, the raw-sausage casing according to the present invention has on its inner surface rectangular (preferably square) compressed areas and between these, uncompressed webs, the edges of the rectangles being parallel or perpendicular to each other and to the longitudinal axis of the sausage casing.

The side lengths of the rectangles lie in the range from about 0.5–1.5 mm, the width of the webs in the area of about 0.3–1 mm. The wall thickness, measured at the uncompressed webs, is about 0.125–0.25 mm and, in the area of the compressed rectangles, is about 0.06–0.125 mm. The surface compression ratio $V_F$ provides the ratio of the compressed fleece surface (the area sum of all the rectangles-$\epsilon F_{rectangle}$) to the uncompressed fleece surface (the area sum of all the webs-$\epsilon F_{webs}$):

$$V_F = \frac{\Sigma F_{rectangles}}{\Sigma F_{webs}}. \qquad \text{Eq. 1}$$

According to this, $V_F$ is determined by the selection of the rectangular sides and the width of the webs alone.

Accordingly, the depth compression ratio $V_T$ is the ratio of the embossed depth $T_G$ to the initial wall thickness $W_{Ausg}$:

$$V_T = \frac{T_G}{W_{Ausg}}. \qquad \text{Eq. 2}$$

At a constant fleece initial wall thickness, $V_T$ is determined by the embossed depth alone.

For the smallest web width and the maximum rectangle side length, a maximum area compression ratio can be calculated according to Equation 1, this being $$V_{FMax.} = \frac{(1,5)^2}{(0,3)^2 + 2 \times 0,3 \times 1,5} = 2,27$$

and correspondingly with the greatest web width as well as the smallest rectangle side length, a minimum area compression ratio of $$V_{FMin.} = \frac{(0,5)^2}{(0,5)^2 + 2 \times 1 \times 0,5} = 0,125$$

The maximum depth compression ratio at a constant fleece wall thickness of 0.250 mm occurs according to Equation 2 at the embossed depth $$V_{TMax.} = \frac{0,125}{0,250} = 0,5$$

and the minimum depth compression ratio $$V_{TMin.} = \frac{0,06}{0,250} = 0,24$$

for the smallest embossed depth.

At a $V_F$ greater than 2.27 and $V_T$ greater than 0.5 the foil character of the partially compressed spun fleece will predominate. This results in a number of disadvantages. The force-length change diagram will deviate more from the Hooke elasticity condition. The curve will be S-shaped. The fleece becomes increasingly brittle and loses too much strength. It is no longer possible to reach an appropriate gradient value $$\frac{F_y}{\Delta l_x}.$$

At a $V_F$ smaller than 0.125 and a $V_T$ smaller than 0.25, on the other hand, the fleece character will dominate, which also entails disadvantages. The force-length change diagram is characterized by an irreversible flow state. The required short elongation capability is no longer met. The purely Hooke region of the force-length change diagram, reduced to 20% of the tensile strength, leads to gradient values that are clearly below 1.0 n/mm.

In essence, this inadequate behaviour is caused by the defective thermal melting of the fibre crossover points within the fleece.

Raw sausage casings of polyamide-6-random spun fleeces with the above-described characteristics have not been known up to now nor proposed.

The raw sausage casing according to the present invention displays a number of valuable characteristics. It displays elastic behaviour according to Hooke's Law over the whole area of the skin that is processed. This is important because it ensures that the casing expands elastically to the correct diameter during the filling process. The short elongation capability that is also provided is connected with this and prevents a partial and permanent deformation of the casing under the loads imposed during the filling process. The gradient values from the force-length change diagram indicate that during the filling process the casing is distended elastically at least so far that, even in the case of long-curing, high quality raw sausage, it can keep up with the contraction of the filling, which can amount to up to 45%, by volume, and still remain crease-free.

Finally, characteristics that are in point of fact antithetical to each other can be combined optimally in the raw sausage casing according to the present invention—such characteristics as (a) rapid curing, although without the separation of fat, (b) rustic appearance with a homogeneous structure, (c) strong adhesion of the filling with ease of skinning, all being difficult to achieve with a pure fleece as with a pure film.

Rapid curing means a high drying rate, and thus a preferred fleece structure that also delivers optimal smoking results. However, undesirably large amounts of fat escape if a pure fleece is used.

The casing according to the present invention presents a balanced compromise in this regard.

The same also applies to the way the casing adheres to the surface of the meat. Because of the protein-like structure of the carbon amide group -CO—NH— in the polyamide macromolecule, all planar polyamides display special adhesion to the filling. On the one hand, this can be a highly desirable characteristic if it is a matter of preventing the casing from separating away from the filling or of ensuring the response of the casing during the curing process (preventing the formation of fat pockets at the contact surfaces between the casing and the filling). On the other hand, strong adhesion is extremely burdensome if the casing is to be removed prior to consumption and especially at a particular desired location-namely, at the contact surfaces between the casing and the filling. Here, too, the raw sausage casing according to the present invention achieves an optimum result in that the casing does not separate into individual strands when removed but can be skinned off easily and completely.

A further desirable and new, positive characteristic of the raw sausage casing according to the present invention is seen in its excellent characteristics with regard to stitching. It can be stitched, like a fabric, into special shapes and delivers seam strengths that cannot be achieved with either uncompressed or totally compressed fleeces.

The raw sausage casing according to the present invention is produced by a process that also constitutes part of the present invention in that a spun random fleece of polyamide-6 that is free of binding agent is subjected to a thermo-mechanical partial compression and embossing treatment, whereupon the partially compressed and embossed fleece is joined together in the longitudinal direction so as to form a tube whereby, according to a preferred embodiment, only one surface is embossed which then forms the inner side when joined together so as to form the tube.

A highly isotropic polyamide spun fleece with a surface weight of 30 to 80 g/m$^2$ and/or thicknesses of 0.125 to 0.250 is used as the starting material.

The partial compression treatment is completed by the application of pressure and increased temperatures, preferably by means of a pair of rollers, said rollers forming a gap through which the fleece is passed.

It is preferred that the upper roller have a hardened metal surface that is formed with equispaced longitudinal and transverse grooves, and which can be heated to approximately 600 K. The upper roller can be pressed at a pressure of up to 200 bar onto the lower roller which, according to a preferred embodiment, has a smooth surface and a non-sticking coating. The lower roller, which can be a rubber roller, can optionally be cooled. The pressure and temperature of the upper roller are so adjusted that the fleece is compressed by the projecting squares of the upper roller, and remains uncompressed in the area of the grooves so that uncompressed webs remain between compressed rectangles.

The resulting rectangular shapes on the upper roller are preferably square and have a side length of 0.5 to 1.5 mm. The grooves between the rectangular shapes are of rectangular cross section. Their length amounts to 0.3 to 1 mm, and they are 0.06 to 0.125 mm deep. The longitudinal and the transverse grooves of a given roller preferably have the same contours although their dimensions can also be different.

The rate at which the fleece is fed into the described pair of rollers amounts to 5 to 20 m/minute. The spun random fleece is partially compressed in a precisely defined manner in the gap between the rollers. When this is done the outline of the upper roller is transferred to the surface of the spun fleece, whereas the underside remains smooth. The resulting quadrilateral shapes on the upper roller compress the fleece, whereas the grooves allow the fleece to pass through uncompressed.

As will immediately be apparent, the partially compressed areas have a wall thickness that is reduced by the height of the quadrilateral shapes and the areas that pass through the gap between the rollers uncompressed. The latter have retained their typically fibre-like structure whereas the former have now adopted a film-like structure and appear to be almost transparent. This different structure is the main feature of this application. It is the basic prerequisite for fulfilling the previously cited specific features 1, 2 and 3. It is defined by means of a particular area and depth compression ratio.

Production of the raw sausage casing from the partially compressed fleece is carried out in conventional manner by adhesion, stitching or welding along the longitudinal axis. Known and suitable adhesive formulations are set out in Volume IV of the plastics handbook *Polyamides* by Vieweg-Mueller (Carl Hanser Verlag), pp. 412–420.

Stitching and welding are preferred as dry joining methods. However, the production technique that is especially preferred is welding. Hot-element welding, high-frequency welding, and ultrasonic welding are all equally well suited as known methods. These are described in the above-cited plastics handbook, Volume VI, at pages 408–414.

Production is carried out from the spun random fleece cut to the correct area size in accordance with the diameter to be produced and pretreated according to the present invention. This is rolled off from the supply roll, formed over a suitable forming slip so as to overlap slightly along the longitudinal axis so as to form a tubular casing and then fixed in this particular shape by means of welding (stitching, adhesion). The tube then passes, optionally, through a drying tunnel if it has been cemented beforehand. However, it is preferred that it be laid flat and rolled immediately after the welding (stitching) process has been completed.

The casing can be marked by any known methods. These include colouring, printing, gathering up, binding, stitching into special shapes, etc.

Figure 1:
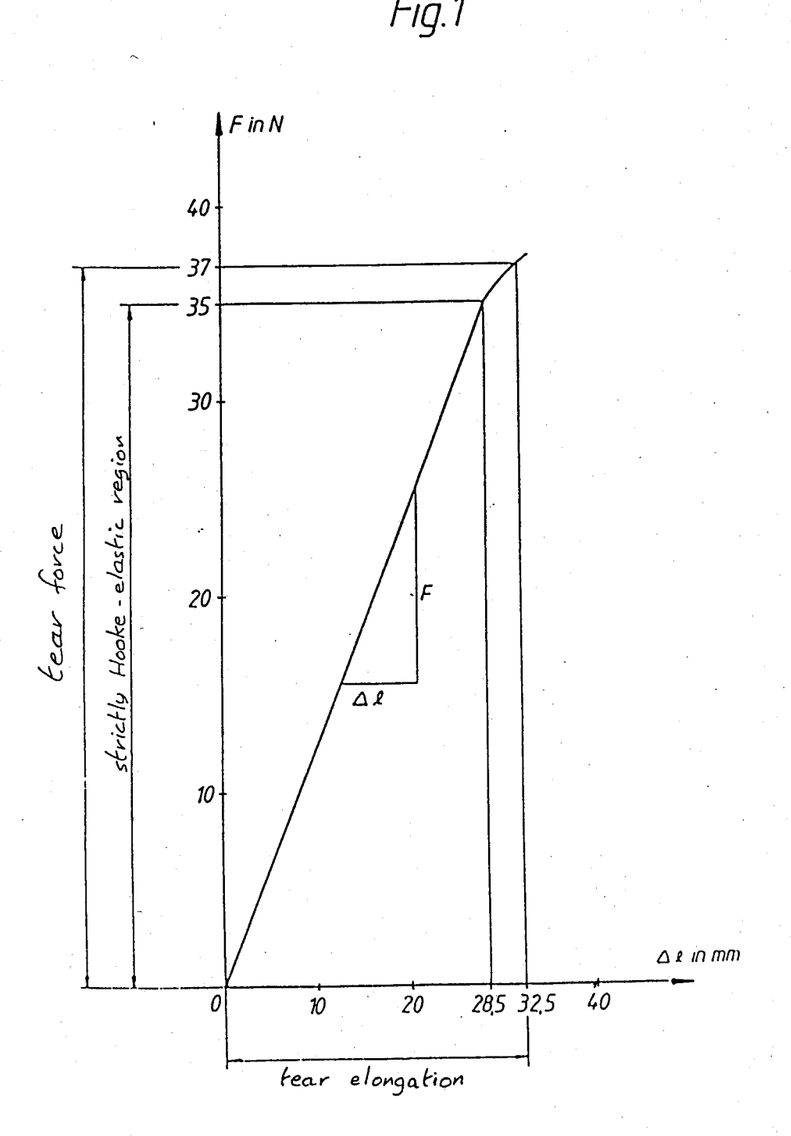
FIG. 1 is the force-length change diagram of a raw sausage casing according to the present invention, produced as described in Example 1.
Figure 2:
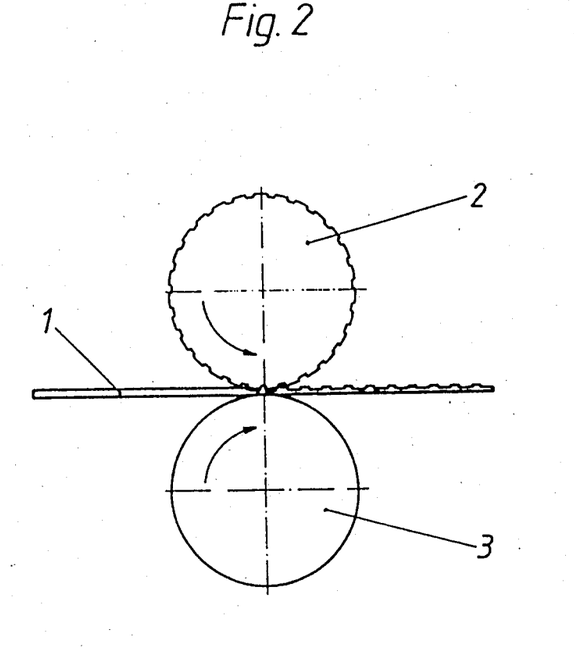
FIG. 2 shows the partial deformation of a thermoplastic spun fleece between rollers including an embossing roller.
Figure 3:
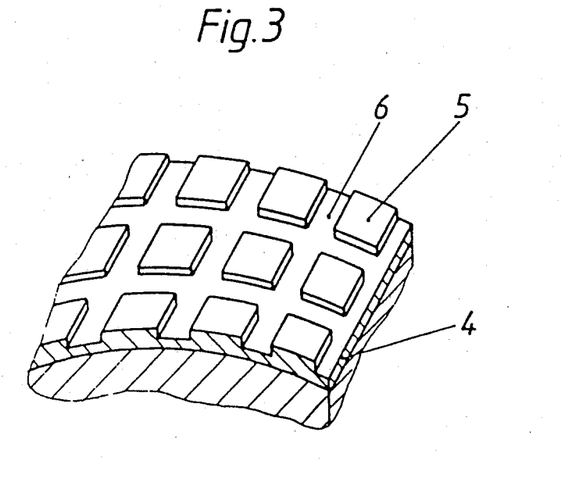
FIG. 3 shows a section of the surface of the embossing roller of FIG. 2.

Referring to FIG. 2, the isotropic PA-6 spun fleece 1 is passed between a pair of rollers 2 and 3, the upper roller 2 being embossed and the lower roller being smooth. FIG. 3 shows the roller 2 having a hardened metal surface 4 formed with quadrilateral raised areas 5 with equispaced grooves or webs 6 extending transversely and longitudinally therebetween. The quadrilateral areas 5 are preferably square and the grooves 6 are preferably rectangular in cross-section.

Figure 4:
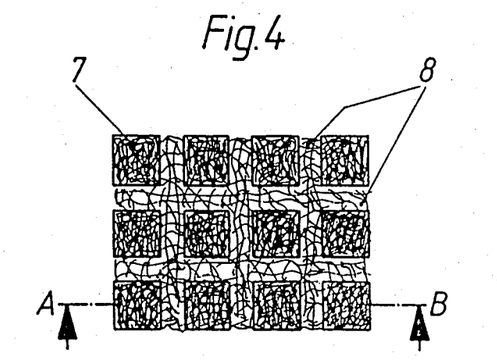
FIG. 4 shows the spun fleece produced as in Example 1 in plan view.
Figure 5:
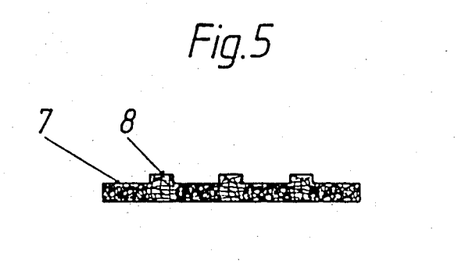
FIG. 5 shows the fleece as in FIG. 4, in section along the line A–B.

FIGS. 4 and 5 show the spun fleece in plan view—partially compressed, embossed areas 7 having a wall thickness which is reduced by the height of the rectangular areas alternating with uncompressed areas 8.

Example 1

Pure polyamide-6 (PA-6) with a relative viscosity of 3.2, measured in 96% sulphuric acid according to DIN 53 727 at 298 K., of which the monomer and oligomer component fractions extracted in boiling water for 18 hours are less than 0.35%, is conventionally formed into an isotropic spun random fleece with a surface weight of 60 g/m² and a starting wall thickness of 0.210 mm. This spun random fleece is then passed at 10 m/minute through the gap between a pair of rollers, the upper roller of which has a rectangular gravure with an edge length of 0.8 mm, an engraving depth of 0.080, and a web width of 0.4 mm. The hardened metal surface of this embossing roller was heated to 500 K. and pressed at 130 bar against the smooth anti-adhesive rubberized lower roller. On passing between this pair of rollers, the PA-6 spun fleece was partially compressed thermo-mechanically and acquired an embossed upper surface and a smooth underside. The wall thickness of the compressed areas mounted to 0.130 mm, whereas the uncompressed areas retained their initial or starting wall thickness of 0.210 mm. A value of $$\frac{(0,8)^2}{(0,4)^2 + 2 \times 0,4 \times 0,8} = 0,8$$

was calculated for the area compression ratio $V_F$.

The depth compression ratio $V_T$ amounted to:

$$\frac{0,080}{0,210} = 0,38$$

The force-length change diagram of the fleece treated according to the present invention was established on the basis of DIN 53 455 from fleece strips of 15±0.1 mm wide and 50 mm long taken in the transverse direction.

The area that is strictly elastic according to Hooke's Law extends from 0 to 35N and thus corresponds to 94.6% of the tensile strength of 37N. The tear elongation amounts to 32.5 mm—i.e., relative to 50 mm span, 65%. The gradient value $$\frac{F_y}{\Delta l_x}$$

in the Hooke area reaches 1.23 N/mm.

The fleece strip so obtained was then cut into 913.5 mm wide strips and formed by a forming slip into a tube of 60 mm diameter. The fleece ends, which overlap by a width of 5 mm, were then ultrasonically welded continuously in the longitudinal direction between a structured sonotrode and a smooth anvil, laid flat, and then rolled. The embossed surface of the fleece formed the inside surface of the casing. Gathering to 20-m chains on a commercial gathering machine of the type KUKO 6, of the Kollross Company, D-6080 Gross-Gerau, West Germany followed the automatic processing on a fill-and-clip machine of the type FCA, of the Niedecker Company, D-6000, Frankfurt/Main, West Germany, whereby the casing was filled with high quality salami filling.

The product withstood both the loads imposed by gathering and also the automatic processing with the clip machine, without any damage or failure. The full diameter amounted to 66±1 mm over the whole length of the 50-cm long raw sausage. On the 28th day of conventional curing, the cure was already well advanced with a 38.8% weight loss. No fat leakage could be detected from any of the 200 raw sausages. The skins could be peeled from slices of the raw sausage without any difficulty, and without leaving any fragments of fleece or filling on the slices. Separation of the casing and the filling always occurred along the intended contact surface. The embossed pattern of the inner surface of the casing had been transferred to the peeled-off sausage surface, which shows that the contact between the webs of the casing and the filling during the whole of the curing cycle had never been broken. No separation of the fleece casing from the filling could be detected in any of the 200 sausages. This makes it quite plain that the compressed fleece areas were not in any rigid contact with the filling and this was the cause of the outstanding peeling results that were obtained. The rustic appearance of the heterostructure of the casing and the outstanding smoke colour resulting from the excellent smoking characteristics are evidence of the balance achieved amongst the further characteristics.

Example 2

Example 2 differs from Example 1 only in the technique used to assemble the casing. The casing is produced by stitching along the longitudinal axis. Whilst achieving the same results as were achieved in Example 1, in this particular example, in addition, the bursting pressure of the casing during the filling process was measured with an inductive type pressure system P11 (HBM, D-6100, Darmstadt, West Germany). The bursting pressure amounted to 0.42 bar overpressure (the average of 10 measurements). All types of casings burst along the seam at this pressure.

Example 3 (comparative example)

The same PA-6 initial spun random fleece as used in Example 1 was welded up ultrasonically to form a 60-mm diameter fleece casing, this being done without any thermo-mechanical partial compression. No $V_F$ or $V_T$ values can be quoted for these casings since the initial fleece structure was fully retained without compression.

Figure 7:
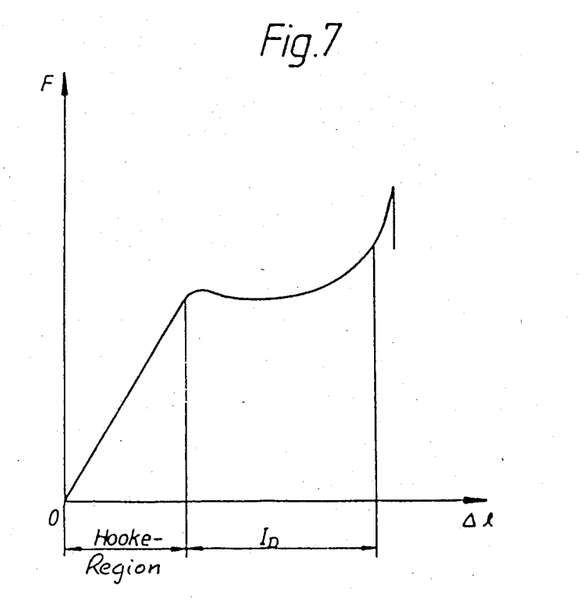
FIG. 7 shows the force-length change diagram of a spun fleece produced according to comparative Example 3.

The force length change diagram for this fleece is shown by the curve in FIG. 7. The irreversible deformation zone $I_D$ can be seen on the diagram, as can the great elongation caused thereby—far in excess of 90%—and the lack of Hooke elasticity up to 90% of the tensile strength. For this reason, there is no point in calculating the gradient value $$\frac{F_y}{\Delta l_x}.$$

The casings could be gathered and filled without failures. However, local deformations occurred in nearly all the sausages during the filling process and this made it impossible to keep to a regular filled diameter. Curing took place even faster than in the casings described in Examples 1 and 2, with a 43% weight loss in 28 days. Fat loss was observed in 30% of the 200 trial sausages after 3 weeks of curing. It was impossible to peel the casings from the sausages without fragments of the fleece remaining on the slices. Despite an excellent smoke colour and smoky flavour, the casings in this example were not as rustic as the casings in Examples 1 and 2, as they appeared to be homogeneously single-phase.

Example 4 (comparative example)

The same procedure was followed as in Example 3, although with the difference that the casings were produced by stitching along the longitudinal axis. Bursting pressure measurements, made in a manner similar to those used in Example 2, led to an average value of 0.23 bar overpressure. In three measurements it was seen that the cases burst outside the area of the butted seam. This shows that the stitching strength of the cases used in this example could not be compared with the high level of stitched strength found in the casings in Example 2.

Example 5 (comparative example)

This comparative example differs from Example 1 only in the methods used for thermo-mechanical compression.

The starting fleece in Example 1 was compressed under the same conditions, although using a smooth hard metal roller, was compressed over its total surface. Thus, the starting fleece had a final wall thickness of 0.12 mm. The fleece structure was converted into an almost transparent film. No values can be cited for $V_F$ and $V_T$ because of the total-surface compression.

Figure 6:
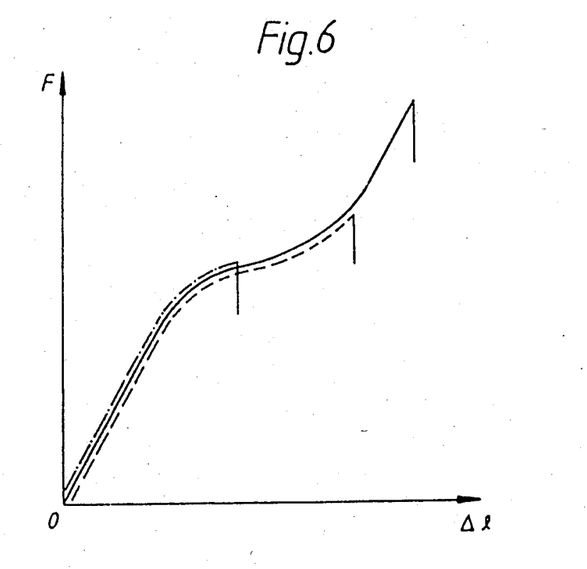
FIG. 6 shows the force-length change diagram of a spun fleece as in comparative Example 5.

The curve shown in FIG. 6 indicates the force length-change diagram for this fleece. An S-shape with irreversible deformation in the middle 1 area can be seen in this diagram. Because of the brittleness that occurred it was impossible to reproduce the curve for different transverse measurement strips (compare the continuous or dashed/dashed-dotted curves). The condition for Hooke elasticity is not met and thus it is impossible to quote the gradient value $$\frac{F_y}{\Delta l_x}.$$

Because of the brittleness of the fleece the tensile strength was so varied that short-elongation and long-elongation patterns resulted.

Wastage occurred during ultrasonic welding of the fleece to form the casing on account of frequent breaks. Holes were formed during the gathering process. Unacceptably high clip wastage was formed during the filling process. A weight loss of only 18% took place after 28 days of curing. Fat retention was guaranteed up to the holes caused by gathering.

It proved impossible to peel the casing off the filling with any ease. Several attempts had to be made in order to remove the casing from the slices of sausage and yet leave no residue. The degree of smoking was just acceptable but a rustic, textile appearance was lacking. The cases in this example are unusable.

Example 6 (comparative example)

This was a repetition of Example 5 although in this example the casings were stitched from the fleece as in Examples 2 and 4. The bursting pressures that were achieved were on average 0.18 bar overpressure. The point of burst for all 10 sample casings was the seam. Thus, the stitched strength of these casings is significantly lower than those quoted for Example 2.

The present invention is, of course, in no way restricted to the specific disclosure of the specification and drawings, but also encompasses any modifications within the scope of the appended claims.

What we claim is:

1. A raw sausage casing which comprises:
   a spun random fleece which forms the sausge casing, with said fleece comprising at least one polyamide which contains no binding agent, and with said fleece being provided with edges and a longitudinal axis, wherein said edges are joined in a longitudinal direction along said longitudinal axis in such a way as to form a tube including webs of uncompressed fleece and areas of compressed fleece to avoid disadvantages of fray encountered during unpeeling of the sausage casing, said fleece further being provided with predetermined areas which are embossed by partial compression, with said partial compression having an area compression ratio $V_F$, which is a ratio of compressed fleece surface that represents area sum of all predetermined areas compressed by being embossed relative to uncompressed fleece surface representing area sum of all webs, and a depth compression ratio $V_T$, which is a ratio of embossed depth relative to initial wall thickness, and wherein said area compression ratio falls within a range of 0.12 to 2.3 and said depth compression ratio falls within a range of 0.24 to 0.5.

2. A raw sausage casing according to claim 1, wherein said fleece is a polyamide selected from the group consisting of PA6, PA6-6, PA6-10, PA11, PA12, and copolyamides of two or more monomeric precursors thereof.

3. A raw sausage casing according to claim 1, wherein said fleece is composed of a plurality of polyamides selected from the group consisting of PA6, PA6-6, PA6-10, PA11, PA12, and copolyamides of two or more monomeric precursors thereof.

4. A raw sausage casing according to claim 1, wherein said tube is provided with an inner surface and an outer surface, with said inner surface being embossed and said outer surface being smooth.

5. A raw sausage casing according to claim 1, wherein said fleece has a predetermined force-length change in a direction which is transverse to said longitudinal axis thereof, and wherein said force-length change:
  (a) extends elastically according to Hooke's Law up to at least 90% of its tensile strength;
  (b) encounters gradient values calculated from the area compliant with Hooke's Law that are $$\frac{F_y}{\Delta l_x} > 1 N/mm;$$

and
  (c) involves an elongation that is less than 90%;
  all values being measured on strips 15±0.1 mm wide and 50 mm long, and wherein $F_y$ indicates the tensile force in N and $\Delta l Hd\ x$ stands for the change in the measured length in millimeters caused by a force $F_y$.

6. A raw sausage casing according to claim 1, wherein said embossed area is provided with rectangular compressed areas and with uncompressed webs, with said uncompressed webs being positioned between said rectangular areas, and wherein said rectangular areas are provided with sides which are parallel or perpendicular to one another and which thereby extend parallel or perpendicular to said longitudinal axis of said fleece which forms said sausage casing.

7. A raw sausage casing according to claim 1, wherein said sides of said rectangular areas measure from about 0.5 to 1.5 mm, said uncompressed webs have a width which measures from about 0.3 to 1 mm, said uncompressed webs have a wall thickness which measures from about 0.125 to 0.25 mm, and said rectangular areas have a wall thickness which measures from about 0.06 to 0.125 mm.

8. A proces for the production of a raw sausage casing, which includes the steps of partially and permanently compressing a spun random fleece which has at least one polyamide and which contains no binding agent, forming an embossed surface on said fleece, and joining said fleece along its edges so as to form a tube including webs of uncompressed fleece and areas of compressed fleece to avoid disadvantages of fray encountered during unpeeling of the sausage casing, said partially and permanently compressing including an embossing by partial compression with said partial compression having an area compression ratio $V_F$, which is a ratio of compressed fleece surface that represents area sum of all predetermined areas compressed by said embossing relative to the uncompressed fleece surface representing area sum of all webs and a depth compression area $V_T$, which is a ratio of embossed depth relative to initial wall thickness, and wherein said ratio compression ratio falls within a range of 0.12 to 2.3 and said depth compression ratio falls within a range of 0.24 to 0.5.

9. A process according to claim 8, wherein said spun random fleece is partially compressed providing one surface of said fleece which is smooth and unembossed and one surface of said fleece which is embossed, and wherein said tube is formed with said embossed surface being on the inside of said tube.

10. A process according to claim 8, wherein said fleece is an isotropic spun random fleece composed of polyamide-6 having a surface weight of 30 to 80 g/m$^2$ and wall thickness of 0.125 to 0.250 mm.

11. A process according to claim 8, wherein said partial compressing step is a thermomechanical partial compression process which is carried out at a pressure of up to 200 bar and at temperatures of up to 600 K.

12. A process according to claim 11, wherein said partial compression step is effected by a pair of rollers, with one roller having a surface that is wear-resistant, is formed with longitudinal and transverse grooves, and may be heated, and with one roller having a surface which is non-sticking and which may optionally be cooled.

13. A sausage casing according to claim 1, wherein said fleece is provided with a sausage filling that may be cured in air.

14. A process according to claim 8, which includes the further steps of filling said tube with a sausage, and air-curing said sausage casing and its filling.

* * * * *

UNITED STATES PATENT AND TRADEMARK OFFICE
CERTIFICATE OF CORRECTION

PATENT NO. : 4,786,512
DATED : Nov. 22, 1988
INVENTOR(S) : Gayur Erk et al

It is certified that error appears in the above-identified patent and that said Letters Patent is hereby corrected as shown below:

COLUMN 11, line 36;

Claim 5, third line from the bottom, "$\Delta 1Hd\ x$" should be -- $\Delta 1_x$ --.

Signed and Sealed this

Twelfth Day of May, 1992

Attest:

DOUGLAS B. COMER

Attesting Officer

Acting Commissioner of Patents and Trademarks